(12) United States Patent
Stewart

(10) Patent No.: US 6,272,629 B1
(45) Date of Patent: Aug. 7, 2001

(54) METHOD AND APPARATUS FOR ESTABLISHING NETWORK CONNECTION FOR A PROCESSOR WITHOUT AN OPERATING SYSTEM BOOT

(75) Inventor: David C. Stewart, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/221,575

(22) Filed: Dec. 29, 1998

(51) Int. Cl.[7] ....................................................... G06F 9/445
(52) U.S. Cl. ................................................. 713/2; 709/222
(58) Field of Search ............................. 713/1, 2; 709/222

(56) References Cited

U.S. PATENT DOCUMENTS 5,444,850 * 8/1995 Chang .................................. 709/222
5,680,547 * 10/1997 Chang .................................. 709/222

* cited by examiner

*Primary Examiner*—Thomas M. Heckler
(74) *Attorney, Agent, or Firm*—Antonelli, Terry, Stout & Kraus, LLP

(57) ABSTRACT

A method and apparatus are provided to establish a network connection for a processor in an operating system-absent environment (i.e., without or prior to an operating system boot). Pre-boot services are first loaded into a volatile memory from a non-volatile memory. These pre-boot services include code for a modem driver. The modem driver code is then used to establish the network connection. In addition, in situations where it is desired to minimize the amount of non-volatile memory required on-site at the processor, the code stored in the non-volatile memory for the modem driver can be limited to only the code necessary to establish a low-speed initial connection. Once the processor is connected to the network, code for a high speed modem driver can be downloaded to the volatile memory of the processor. By virtue of being able to establish a network connection in an OS-absent environment, remote management of the processor can be provided, including diagnostics, repair and updating, even in situations where the operating system cannot be booted.

27 Claims, 2 Drawing Sheets

METHOD AND APPARATUS FOR ESTABLISHING NETWORK CONNECTION FOR A PROCESSOR WITHOUT AN OPERATING SYSTEM BOOT

FIELD OF THE INVENTION

The present invention relates to providing a network connection for a processor without the need for an operating system boot.

BACKGROUND OF THE INVENTION

A significant problem in the computer area involves how best to provide for management of computers, including, for example, providing maintenance and update information. In the past, it has been common to provide service contracts for personal visits by repair personnel to maintain and update computer equipment. Obviously, this is an expensive and time consuming approach. Accordingly, significant efforts have been made toward providing remote management for computers to eliminate the need for such personal service calls.

In Local-Area-Networks (LANs), systems such as the Intel Wired-for-Manageability (WfM) have been developed to perform diagnosis, repair and update operations without the need for personal service calls. However, such systems are generally not readily adaptable to so-called "occasionally connected" computers (e.g., consumer personal computers (PCs), corporate desktops in remote branch offices, unattended servers in branch offices, mobile platforms, etc.). In the past, such occasionally connected computers have been remotely serviced or updated by connection over a public network, such as the Internet. However, such remote management operations require the operating system of the computer to be booted in order to establish a modem connection over the network. In many cases, this is impractical because the nature of the problem which the computer is experiencing prevents booting the operating system. Accordingly, a significant need exists for an arrangement that can permit modem connection for diagnosis, update and/or downloading of other desirable information over a network connection without the requirement for an operating system boot, especially in the area of occasionally connected computers.

SUMMARY OF THE INVENTION

A method and apparatus is provided in accordance with the present invention to establish a network connection for a processor without the requirement of booting the operating system. To this end, pre-boot services are loaded into a volatile memory of the processor from a non-volatile memory. These pre-boot services include code for a modem driver. The modem driver code is then used to establish the network connection.

DETAILED DESCRIPTION

Figure 1:
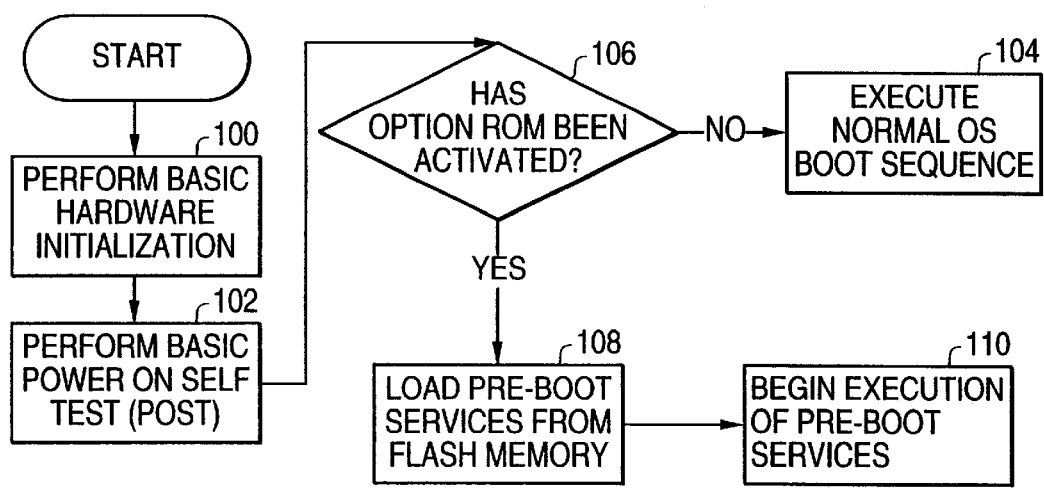
FIG. 1 shows an exemplary power-on sequence in accordance with the present invention to permit establishing a network connection without an operating system boot.

Referring to FIG. 1, an exemplary power-on sequence is shown in accordance with the present invention which is a modified version of the standard power-on sequence typically used in personal computers. Typically, when a personal computer (PC) is turned on, the first step performed is basic hardware initialization, shown as step 100 in FIG. 1. Following this, a basic Power-On-Self-Test Operation (POST) is performed, as shown in step 102 in FIG. 1. The present invention also performs these standard steps. However, in a conventional PC power-on sequence, the next step would be to execute the normal operating system (OS) boot sequence, corresponding to that shown in step 104 in FIG. 1. However, as noted in the preceding discussion, when a computer is experiencing either hardware or software problems, the situation will often occur that the normal OS boot sequence 104 cannot be performed. Accordingly, the power-on sequence shown in FIG. 1 is designed to permit network connection and operation of the computer notwithstanding the inability to execute the normal OS boot sequence 104.

More specifically, in the embodiment shown in FIG. 1, a step 106 is provided between the POST step 102 and the OS boot sequence 104. Step 106 determines whether an option Read-Only-Memory (ROM) in the Basic-Input-Output System (BIOS) has been activated. Typically the BIOS of a computer includes one or more option ROMs to permit the BIOS to be extended to accept new equipment. As will be discussed in greater detail hereinafter, the present invention makes use of such option ROMs to introduce code that can be executed as part of the BIOS initialization in order to load the necessary services to achieve network connection without booting the normal operating system.

One way in which step 106 can be carried out is to provide activation by way of continuously pressing one or more keys on the computer's keyboard (not shown). This permits a user to immediately begin activation of the necessary steps to achieve network connection during the power-on sequence of the computer. For example, if the user turns on the computer and notes that the OS boot sequence 104 is not being carried out, the user can begin a diagnostic process by pressing the appropriate keys to implement step 106 to activate the option ROM of the BIOS to begin network connection. On the other hand, the BIOS could be programmed to automatically provide activation of the ROM to achieve network connection without requiring action by the user (in other words, step 106 could be automatically carried out by the processor during the power-on sequence if the processor determines that the OS boot sequence 104 is not being carried out). Of course, other modes of activation could be implemented, and the present invention is not intended to be limited to either of the above noted approaches. Further, although it has been noted that an option ROM in the BIOS could be used for storing the code for the steps to be described hereinafter, other storage arrangements could, of course, be provided. Any such storage would preferably be non-volatile in order to prevent loss of the necessary code for achieving network connection when the computer is turned off.

If step 106 indicates that the option ROM has been activated, step 108 in the power-on sequence of the embodiment shown in FIG. 1 is performed, specifically, loading pre-boot services from a flash memory, or other appropriate non-volatile storage, into a main memory (typically, a volatile RAM). In accordance with the embodiment of FIG. 1, the pre-boot services are the necessary services for the computer to achieve a network connection without the need for an operating system boot (i.e., step 104). Once the network connection is established, the pre-boot services also provide for the downloading of desired information for operation of the computer in a pre-boot environment.

The code for controlling the loading of the pre-boot services from the flash memory to the main memory and the operation of the computer in the pre-boot environment can be stored into the BIOS. More specifically, this code can be stored in an option ROM of the BIOS, as noted above. It is to be noted, of course, that the pre-boot services could be stored in other types of non-volatile memory, other than flash memory shown in step 108, if so desired. Alternatively, as will be discussed later in accordance with a second embodiment, at least a portion of the pre-boot services can be downloaded from the network connection after an initial connection has been made.

After the loading of pre-boot services in step 108 is complete, the computer can begin execution of the pre-boot services for purposes of establishing the network connection and downloading information from the network connection, as shown in step 110. By virtue of the ability to establish a network connection without an OS boot, it is possible to perform diagnostics and repair of both hardware and software, updating operations, or other desired operations even though the computer may be unable to execute an OS boot sequence 104. Incidentally, although the above description has been primarily directed to a situation where the computer cannot carry out the OS boot sequence 104, it is noted that the present invention could also be applied in situations where the user might simply wish to establish a network connection without the OS boot sequence for some reason. One example might be to set up a periodic self-check operation for a computer without the need of always carrying out the OS boot sequence 104.

Figure 2:
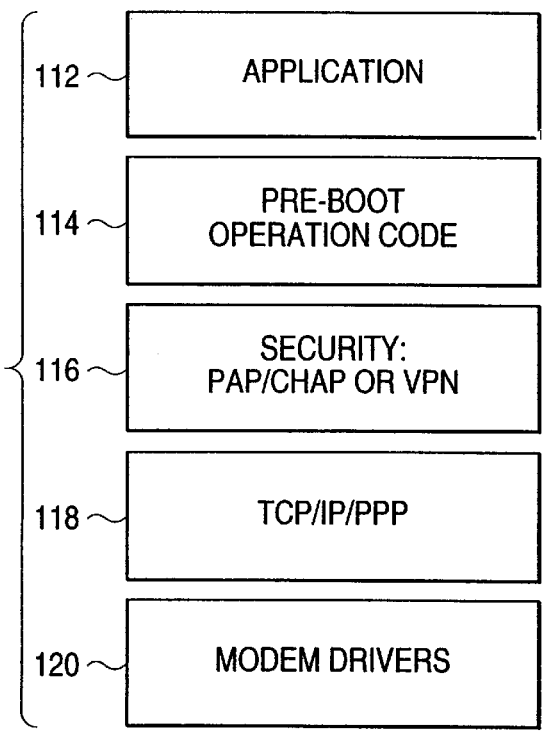
FIG. 2 shows exemplary pre-boot services to be downloaded from a non-volatile storage location to a volatile storage location to permit operation of a processor without an operating system boot.

FIG. 2 shows exemplary pre-boot services which can be loaded in accordance with step 108 of FIG. 1 from a non-volatile memory, such as a flash memory, into a main memory of a processor. Specifically, these services can include one or more applications 112, pre-boot operation code 114, security code 116, e.g., Password Authentication Protocol (PAP), Challenge-Handshake Authentication Protocol (CHAP), or Virtual Private Network (VPN), network protocol 118, e.g., Transmission Control Protocol (TCP), Internet Protocol (IP), or Point-to-Point Protocol (PPP) and code 120 for at least one modem driver.

The application code 112 can include code to identify the type of application program to be run in the OS-absent environment, as well as information to be downloaded from a network service once the network connection has been achieved. This information can include (but is not limited to) software and/or hardware diagnosis/repair and updating operations for the computer. The pre-boot operation code 114 permits execution of the downloaded applications identified by the application service 112. In other words, this code permits operation of the computer in a pre-boot environment without the normal operating system which the computer would otherwise use. As such, it is noted that the code 114 is distinct from the normal operating system which the computer uses. It is also noted that the pre-boot operation code permits control of the computer by the BIOS, using an option ROM in the BIOS, for all of the operations carried out in the pre-boot environment.

The service code 116 provides for security, and typically this would be password protection or, more generally, digital certificate exchange. To this end, a variety of security codes are presently available, and, of course, it is not intended to limit the present invention to any particular security arrangements.

Inasmuch as the present invention is directed to providing a network connection without the need for an operating system boot, it is, of course, necessary to provide some sort of network protocol. In particular, the present invention can be operated on a public network, including, but not limited to, the Internet. Accordingly, a typical network protocol stored as service 118 can be TCP/IP/PPP.

Finally, the pre-boot services will include code for one or more modem drivers. Typically, almost all modems in use at the present time are so-called "driver-based" modems, also referred to as controller-less modems, win-modems or software modems. Such modem drivers generally require a large amount of code for the high speed network connections necessary for operations such as diagnostics, repair and updating. In accordance with the first embodiment of the invention shown in step 108 of FIG. 1, the necessary code for the modem driver can be stored in a flash memory or some other type of nonvolatile memory in the processor itself. However, as will be discussed later with regard to FIG. 4, at least a portion of the large amount of code required for the modem drivers can be provided by downloading code from the network connection. In such a case, only the absolute minimum amount of code necessary to establish initial connection needs to be stored in nonvolatile memory within the processor itself. This will be discussed in detail hereinafter.

It is to be understood, of course, that the pre-boot services shown in FIG. 2 are solely for purposes of example, and it is not intended that the pre-boot services be limited by the specific services shown therein.

Figure 3:
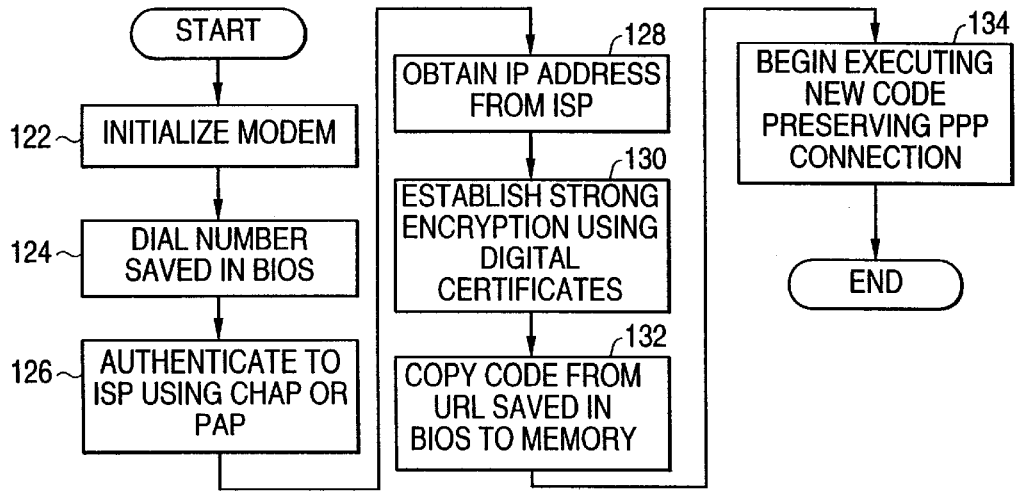
FIG. 3 shows an exemplary process of establishing a network connection without an operating system boot using the pre-boot services shown in FIG. 2.

FIG. 3 shows an exemplary process as one embodiment for implementing the step 110 of FIG. 1 (i.e., execution of the pre-boot services) using the pre-boot services of FIG. 2, after the pre-boot services have been loaded (i.e., after step 108). First, in step 122, a modem of the processor is initialized using the modem driver code 120. Next, in step 124, the processor will dial a number of an Internet Service Provider (ISP). As noted in FIG. 3, the ISP telephone number can be stored in the BIOS, for example, in an option ROM, or in another part of the BIOS which is readable and writable, and has a standard interface for structure and access, for example, part of the non-volatile RAM. Using the security code 116, the processor can provide an authentication signal to the ISP in step 126, using CHAP or PAP, for example, or other appropriate password protection.

Once the processor has been authenticated in step 126, it can obtain an Internet Protocol (IP) address from the ISP of the desired host in step 128. Specifically, the IP address is assigned to the calling computer, and used to identify this computer to the Internet. Having this address enables other computers on the Internet to connect with the calling computer. In step 130, strong encryption can be established using digital encryption. Having completed these steps, the processor can now execute step 132 of securely downloading code from an Uniform Resource Locator (URL) specified by the BIOS. The downloaded code is then transferred in step 132 to the main memory.

With the downloaded code, the processor can execute the desired operation in step 134. In other words, in step 134, the computer can operate to perform the desired application (identified originally by the application code 112), under the control of the BIOS. This execution is carried out with the pre-boot services transferred in step 108 to the main memory and the downloaded code which is also transferred to the main memory in step 132, all under control of the BIOS. As such, it is possible for the computer to carry out prescribed applications without the need of an OS boot. As noted previously, these applications can include diagnostics, repair, updating and other desired operations.

In the embodiments discussed above, the modem code for establishing the network connection has been described as being stored in a non-volatile memory, such as a flash memory, either in or coupled to the processor itself. Operationally, this approach works well since commercially available non-volatile memory such as flash memory, PROMs, EPROMs, EEPROMs, etc. provide secure code storage which can readily be used to establish a reliable network connection. On the other hand, the cost of such non-volatile memories is still relatively high, and they are generally regarded as precious resources for the many functions for which they are useful in a processor. Also, as noted above, to establish a high speed reliable modem connection which is necessary for operations such as diagnosis, repair, update, etc., a great deal of code is necessary for presently available modem drivers. In short, at the present time, if non-volatile storage such as flash memory is used for storing the modem code necessary for high speed connection, the cost of the processor will be increased.

Figure 4:
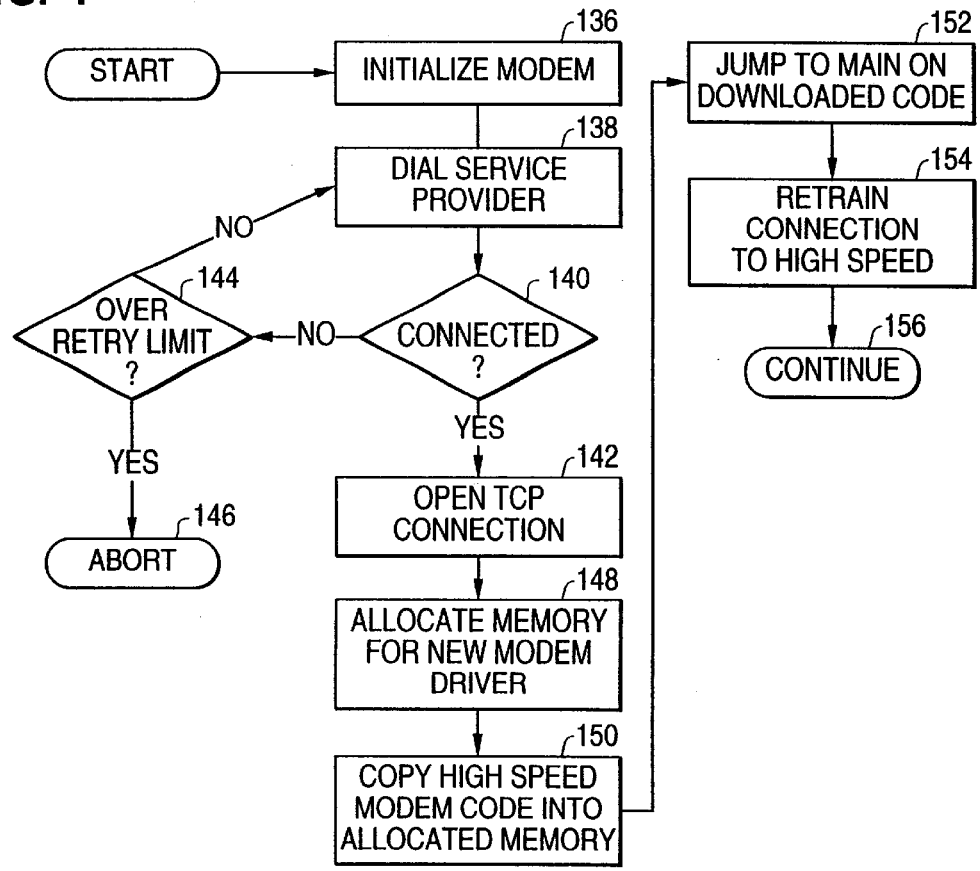
FIG. 4 shows an exemplary process for establishing a high speed network connection without an operating system boot, after first establishing a network connection at a lower speed.

FIG. 4 shows an alternative embodiment which permits establishing a high speed modem connection while minimizing the use of non-volatile memory in or coupled to the processor itself. Specifically, one of the interesting features of driver-based modems is that low speed connections can be achieved with a relatively small amount of code, while higher speed connections require up to ten times the amount of code space. As noted above, in order to establish a useful connection with presently used network protocols such as TCP/IP for downloading the type of information generally desired, high speed connections are necessary. Accordingly, FIG. 4 shows an arrangement which supports a high speed connection while using only enough non-volatile storage at the processor to establish a low speed connection.

The basic concept of the process shown in FIG. 4 is to establish a low speed driver-based modem connection initially using the limited amount of code required for such a low speed connection. This small amount of code can be stored easily in non-volatile storage in or coupled to the processor. For example, the code can readily be stored in a small amount of space in a flash memory. As noted above, the total amount of code required for a low speed driver-based connection is much smaller than that required for the high speed connection. Once the initial connection is established, the code to establish the higher speed connection can be downloaded over the low speed connection. Once the download of the high speed code is complete, the new modem code can be started (preferably under control by the BIOS) and the higher speed connection can then be established. Although the arrangement shown in FIG. 4 requires initial slow speed operation for download of the amount of code required to establish a high speed connection, the overall savings in terms of required non-volatile storage space at the processor itself can be quite significant.

Referring to FIG. 4, an example is shown of an embodiment to carry out the operation of first establishing a low speed modem connection with code stored on-site, and then retraining the connection to establish a high speed connection using downloaded code. It is to be noted, of course, that the process shown in FIG. 4 is carried out after the power-on sequence of FIG. 1 has been carried out through step 108, and after the pre-boot services such as shown in FIG. 2 have been loaded into the main memory. In this case, the modem driver code 120 that has been loaded into the main memory at the beginning of the process shown in FIG. 4 is the relatively small amount of code necessary to establish a low speed initial connection.

In step 136, the modem of the processor is initialized using the modem code 120 to prepare for making the initial low speed connection. In step 138, the telephone number for the ISP (stored in the BIOS, for example) is dialed. Step 140 is a determination of whether the connection has successfully been made to the ISP. If the connection has been made, the process continues to the next step 142 of opening the TCP connection between the processor and the ISP. On the other hand, if successful connection is not initially achieved, the processor will attempt to redial the ISP for a predetermined number of tries. If the retry limit is exceeded in step 144, the operation will be aborted in step 146.

Assuming that a successful initial connection has been made in step 142, the processor will be connected to a desired host at a predetermined IP address where the new high speed modem driver code is available. In step 148, the processor will allocate memory space in its main memory for the new modem driver code. Next, in step 150, the processor will copy the high speed modem code into the allocated memory space in its main memory. It is noted that the copying of the high speed modem code takes place over the low speed modem connection. Once the high speed modem code has been copied into the main memory, the processor will jump to the address in the main memory to begin operating with the high speed downloaded code. In the embodiment shown in FIG. 4, the downloaded code will include the necessary code to retrain the low speed connection to a high speed in step 154. Once the high speed connection is established in step 154, the processor will continue to perform the desired applications in step 156 (e.g., diagnostics, repair, update, etc.).

In general, once the new high speed code has been downloaded to the main memory and started, there are different ways to actually increase the speed of the connection. One approach would be to drop the current low speed phone call, redial the number of the ISP (or dial a different number) and establish a new connection at the higher speed. Alternatively, as shown in FIG. 4, once the downloaded code is started, it can detect that the low speed connection has been established and retrain the line to a higher speed. This retraining is a feature built as a command into most presently available high-speed modems. As such, the retraining approach has the advantage of reusing the existing phone connection, thereby minimizing the total time required for carrying out the desired application.

As discussed above, the alternative embodiment shown in FIG. 4 permits establishing a high speed modem connection, without an OS boot, and with a minimum requirement in terms of non-volatile storage within the processor. The savings which can result from this approach can be significant. For example, currently available fully-featured high speed modems, such as the presently popular 56K baud modem typically requires up to 250K bytes of memory. On the other hand, a simple 2400 baud modem generally requires only about 20K bytes of memory space. This is more than a 10:1 size difference. In other words, using the embodiment shown in FIG. 4, the initial low speed modem connection can be established using only 20K bytes of flash memory, or other non-volatile storage. The end result is a savings of over 200K bytes of non-volatile storage space. Many currently available systems are designed to include a 4 megabit flash part to be used for various important processor operations. Generally, the 20K byte requirement for the 2400 baud connection can be added to such a 4 megabit flash memory which is already available. On the other hand, the 250K byte requirement for a 56K baud connection would generally require upgrading to an 8 megabit flash memory, at a significant increase in cost.

In summary, the present invention provides management capability for occasionally connected processors over public networks which is not available in current systems. In addition, particularly with the embodiment shown in FIG. 4, this management capability can be achieved without significant cost in many current processors which presently have both option ROM capability and a limited amount of available flash memory. Of course, the present invention is useful in other situations as well. In particular, the ability to establish network connection in an OS absent environment can be achieved using the present invention, and this capability can be useful in a wide variety of possible applications.

The invention may be embodied in other specific forms without departing from the spirit or essential characteristic thereof. The present embodiments are therefore to be considered in all respects as illustrative and not restrictive.

What is claimed is:

1. A method of establishing a network connection over a public network for a processor prior to an operating system boot, comprising:
    loading pre-boot services into a volatile memory from a non-volatile memory, wherein the pre-boot services include code for a modem driver; and
    using the modem driver code to establish the network connection over the public network.

2. A method according to claim 1, wherein the loading of the pre-boot services is controlled by code stored in a Basic-Input-Output System (BIOS) of the processor.

3. A method according to claim 2, wherein the code is stored in an option ROM in the BIOS.

4. A method according to claim 1, wherein the network is a public network, and wherein the processor is an occasionally connected processor.

5. A method of establishing a network connection for a processor prior to an operating system boot, comprising:
    loading pre-boot services into a volatile memory from a non-volatile memory, wherein the pre-boot services include code for a modem driver; and
    using the modem driver code to establish the network connection, wherein the method further includes determining whether an activation signal is asserted for loading the pre-boot services before the operating system boot.

6. A method according to claim 5, wherein the activation signal is generated from one or more keys on a keyboard coupled to the processor.

7. A method according to claim 1, wherein the pre-boot services are loaded after the processor performs a Power-On-Self-Test operation (POST).

8. A method of establishing a network connection for a processor prior to an operating system boot, comprising:
    loading pre-boot services into a volatile memory from a non-volatile memory, wherein the pre-boot services include code for a modem driver; and
    using the modem driver code to establish the network connection, wherein the pre-boot services include an application specifying the type of information to be downloaded to the processor over the network connection, a pre-boot operating system controlled by the BIOS to download information over the network connection without booting the normal operating system of the processor, security code and network protocol code.

9. A method according to claim 1, wherein the nonvolatile memory storing the pre-boot services includes a flash memory.

10. A method for downloading diagnostic or update information over a network connection to a processor, prior to performing an operating system boot, comprising:
    determining, when the processor is turned on, whether an activation signal indicates a pre-boot download of diagnostic or update information;
    loading pre-boot services into a volatile memory from a non-volatile memory, wherein the pre-boot services include code for a modem driver;
    using the modem driver code to establish the network connection with a network resource; and
    downloading the diagnostic or update information from the network resource to the processor over the network connection.

11. A method according to claim 10, wherein the downloaded diagnostic or update information is stored in the volatile storage, and wherein determining whether an activation signal indicates a pre-boot download, downloading the pre-boot services, using the modem code to establish connection, and downloading and storing the diagnostic or update information are all controlled by the BIOS of the processor prior to performing an operating system boot.

12. A method according to claim 11, wherein the steps of determining whether activation is asserted, downloading the pre-boot services, using the modem code to establish connection and downloading and storing diagnostic or update information are controlled by an option ROM in the BIOS.

13. A method according to claim 11, wherein the network is a public network, and wherein the processor is an occasionally connected processor.

14. A method of establishing a network connection for a processor, prior to an operating system boot, comprising:
    loading pre-boot services into a volatile memory from a non-volatile memory, wherein the pre-boot services include code for a first modem driver;
    using the first modem driver code to establish a first network connection at a first baud rate; and
    downloading code, including code for a second modem driver, from the network to the processor for establishing a network connection at a second baud rate which is greater than the first baud rate.

15. A method according to claim 14, wherein the loading of the pre-boot services is controlled by a code stored in the BIOS of the processor.

16. A method according to claim 15, wherein the network is a public network and wherein the processor is an occasionally connected processor.

17. A method according to claim 16, wherein the first modem driver requires less code than the second modem driver.

18. A method according to claim 17, further comprising establishing the network connection at the second baud rate by ending the connection at the first baud rate, redialing and establishing reconnection at the second baud rate.

19. A method according to claim 17, further comprising establishing the network connection at the second baud rate by continuing the connection established at the first baud rate, and retraining said connection to operate at the second baud rate.

20. A machine readable medium having embodied thereon a program for execution by a machine, the program comprising:

loading pre-boot services into a volatile memory from a non-volatile memory, wherein the pre-boot services include code for a modem driver; and using the modem driver code to establish a network connection over a public network.

21. A machine readable medium according to claim 20, wherein the machine readable medium is an option ROM of a BIOS of a processor for executing the program.

22. A machine readable medium having embodied thereon a program for execution by a machine, the program comprising:

determining, when the processor is turned on, whether an activation signal exists for performing a pre-boot download of diagnostic or update information;

loading pre-boot services into a volatile memory from a non-volatile memory, wherein the pre-boot services include code for a modem driver;

using the modem driver code to establish the network connection with a network resource; and downloading the diagnostic or update information from the network resource to the processor over the network connection, wherein the downloading diagnostic or update information is stored in the volatile storage, wherein the steps of determining the presence of an activation signal, downloading the pre-boot services, using the modem code to establish connection, and downloading and storing the diagnostic or update information are all controlled by the BIOS of the processor without performing an operating system boot.

23. A machine readable medium according to claim 22, wherein the machine readable medium is an option ROM of a BIOS of a processor for executing the program.

24. A machine readable medium having embodied thereon a program for execution by a machine, the program comprising:

loading pre-boot services into a volatile memory from a non-volatile memory, wherein the pre-boot services include code for a first modem driver;

using the first modem driver code to establish a first network connection at a first baud rate; and downloading code, including code for a second modem driver, from the network to the processor for establishing a network connection at a second baud rate which is greater than the first baud rate.

25. A machine readable medium according to claim 24, wherein the machine readable medium is an option ROM of a BIOS of a processor for executing the program.

26. A processor for establishing a network connection over a public network without an operating system boot comprising:

means for loading pre-boot services into a volatile memory from a non-volatile memory, wherein the pre-boot services include code for a modem driver; and means for using the modem driver code to establish the network connection over the public network.

27. A processor for establishing a network connection over a public network without an operating system boot comprising:

a circuit which loads pre-boot services into a volatile memory from a non-volatile memory, wherein the pre-boot services include code for a modem driver; and a circuit which uses the modem driver code to establish the network connection over the public network.

* * * * *